US012465536B2

(12) United States Patent
Mauro

(10) Patent No.: US 12,465,536 B2
(45) Date of Patent: Nov. 11, 2025

(54) ARTICULATING BED CONVERTIBLE TO ASSIST CHAIR

(71) Applicant: Edward Mauro, Oldsmar, FL (US)

(72) Inventor: Edward Mauro, Oldsmar, FL (US)

( * ) Notice: Subject to any disclaimer, the term of this patent is extended or adjusted under 35 U.S.C. 154(b) by 315 days.

(21) Appl. No.: 18/122,240

(22) Filed: Mar. 16, 2023

(65) Prior Publication Data

US 2023/0301859 A1 Sep. 28, 2023

Related U.S. Application Data

(60) Provisional application No. 63/322,459, filed on Mar. 22, 2022.

(51) Int. Cl.
*A61G 7/16* (2006.01)
*A61G 7/015* (2006.01)
*A61G 7/05* (2006.01)

(52) U.S. Cl.
CPC ............... *A61G 7/16* (2013.01); *A61G 7/015* (2013.01); *A61G 7/0507* (2013.01)

(58) Field of Classification Search
CPC .... A61G 7/015; A61G 7/0507; A61G 7/0573; A61G 7/0514; A61G 7/16; A61G 7/053; A61G 7/1076; A61G 7/00; A61G 7/012; A61G 7/052; A61G 7/018; A61G 7/05; A61G 5/14; A61G 7/0506; A61G 5/006; A61G 7/0509; A61G 7/005; A61G 7/0513; A61G 2200/34; A61G 2200/32; A61G 7/0527; A61G 7/002; A47C 20/041; A47C 20/08; A47C 19/045
USPC ........... 5/618, 600, 611, 613, 608, 610, 624, 5/81.1 RP
See application file for complete search history.

(56) References Cited

U.S. PATENT DOCUMENTS

| | | | | |
|---|---|---|---|---|
| 3,336,606 | A | 8/1967 | Beitzel | |
| 5,230,113 | A | 7/1993 | Foster et al. | |
| 5,454,126 | A | 10/1995 | Foster et al. | |
| 5,906,017 | A | 5/1999 | Ferrand et al. | |
| 7,213,279 | B2 | 5/2007 | Weismiller et al. | |
| 7,712,168 | B2 * | 5/2010 | Kim | A61G 7/053 5/942 |
| 10,188,567 | B2 | 1/2019 | Wurdeman | |
| 10,299,977 | B2 | 5/2019 | Fakhrizadeh | |
| 10,492,973 | B2 | 12/2019 | Drake | |
| 2007/0017029 | A1 * | 1/2007 | Wurdeman | A61G 7/16 5/618 |

(Continued)

*Primary Examiner* — Madison Emanski
(74) *Attorney, Agent, or Firm* — ALLEN, DYER, DOPPELT + GILCHRIST, P.A.

(57) ABSTRACT

An articulating bed includes an outer support frame, an inner convertible frame coupled to and supported within the outer support frame, and a mattress platform mounted above the inner convertible frame and configured to support a mattress thereon. The mattress platform has a body platform and a leg platform. The articulating bed also includes a support plate secured to the inner convertible frame, a body lifting device secured to the support plate and to the body platform configured to raise and lower the body platform, and a leg lifting device secured to the support plate and to the leg platform configured to raise and lower the leg platform. The support plate is configured to spin the mattress platform over the outer support frame when the body platform and the leg platform are raised and the mattress platform is converted into an assist chair.

13 Claims, 7 Drawing Sheets

(56) References Cited

U.S. PATENT DOCUMENTS

| | | | | |
|---|---|---|---|---|
| 2007/0174968 | A1 | 8/2007 | Barthelt | |
| 2018/0014990 | A1 * | 1/2018 | Stanislao | A61G 7/015 |
| 2018/0028385 | A1 * | 2/2018 | Sherman | A61G 7/16 |
| 2019/0000238 | A1 * | 1/2019 | Eskridge, III | A61G 7/07 |

* cited by examiner

ARTICULATING BED CONVERTIBLE TO ASSIST CHAIR

RELATED APPLICATIONS

The present invention is related to U.S. Provisional Patent Application Ser. No. 63/322,459 filed Mar. 22, 2022, the entire contents of which are incorporated herein by reference.

FIELD

The present invention relates to the field of medical beds, and, more particularly, to an articulating bed convertible to assist chair.

BACKGROUND

Hospital type beds are adjustable to raise the head or foot of the bed to make the patient comfortable. The height of the beds can also be raised and lowered relative to the floor. The beds typically include siderails so that the patient cannot inadvertently fall out of the bed when sleeping. The siderails are configured to be moved out of the way when the patient is to be moved from the bed to a standing position. For example, the siderails are moved or lowered so that the patient can swing their legs over the side of the bed until they reach the floor and stand up.

However, often times patients need assistance in getting out of the bed and are not able to swing their legs over the side and stand up on their own. This requires a nurse or other caregiver to provide help to the patient to assist the patient in moving from the bed to a standing position. The patient may have to wait for the assistance if a caregiver is not currently available when the patient is not able to accomplish this on their own.

Accordingly, there is a need in the art for a bed that allows a patient to make the easy transition from the bed to a standing position and back without the need of assistance.

In view of the foregoing background, it is therefore an object of the present invention to provide a bed that is easy to operate to move a patient from the bed to a standing position and back with little physical effort and without assistance. This and other objects, features, and advantages in accordance with the present invention are provided by an articulating bed convertible to assist chair.

The articulating bed includes an outer support frame, an inner convertible frame coupled to and supported within the outer support frame, and a mattress platform mounted above the inner convertible frame and configured to support a mattress thereon. The mattress platform has a body platform and a leg platform. The articulating bed also includes a support plate secured to the inner convertible frame, a body lifting device secured to the support plate and to the body platform configured to raise and lower the body platform, and a leg lifting device secured to the support plate and to the leg platform configured to raise and lower the leg platform. The support plate is configured to spin the mattress platform over the outer support frame when the body platform and the leg platform are raised and the mattress platform is converted into an assist chair.

The articulating bed may also include a rotating device configured to spin the support plate and the mattress platform, and a bearing supporting the inner convertible frame along a longitudinal centerline axis. The mattress platform may have a first border section hingedly connected adjacent to a longitudinal edge of the mattress platform and a second border section hingedly connected adjacent to an opposing longitudinal edge of the mattress platform.

In addition, the articulating bed may have a roller device configured to roll the inner convertible frame side to side on the bearing about the longitudinal centerline axis. The inner convertible frame may be configured to roll in a first direction about the longitudinal centerline axis to raise a first side of the mattress platform as an opposing second side of the mattress platform is lowered, where the first border section flips upward to form a V-shaped fold in the mattress platform when rolled in the first direction.

Similarly, the inner convertible frame may be configured to roll in a second direction about the longitudinal centerline axis to raise a second side of the mattress platform as an opposing first side of the mattress platform is lowered, where the second border section flips upward to form a V-shaped fold in the mattress platform when rolled in the second direction.

The articulating be may also have a remote control configured to be used by a patient to control raising and lowering the body and leg platforms, and to control spinning the mattress platform when converting to the assist chair. The articulating bed may have siderails positioned alongside each edge of the mattress platform and configured to keep a patient from falling off the mattress.

In another particular aspect, a method of making an articulating bed convertible to assist chair is disclosed. The method includes providing an outer support frame, coupling an inner convertible frame within the outer support frame, and mounting a mattress platform above the inner convertible frame to support a mattress thereon. The mattress platform includes a body platform and a leg platform. The method also includes securing a support plate to the inner convertible frame and securing a body lifting device to the support plate and to the body platform where the body lifting device is configured to raise and lower the body platform. The method includes securing a leg lifting device to the support plate and to the leg platform where the leg lifting device is configured to raise and lower the leg platform. The support plate is configured to spin the mattress platform over the outer support frame when the body platform and the leg platform are raised and the mattress platform is converted into an assist chair.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
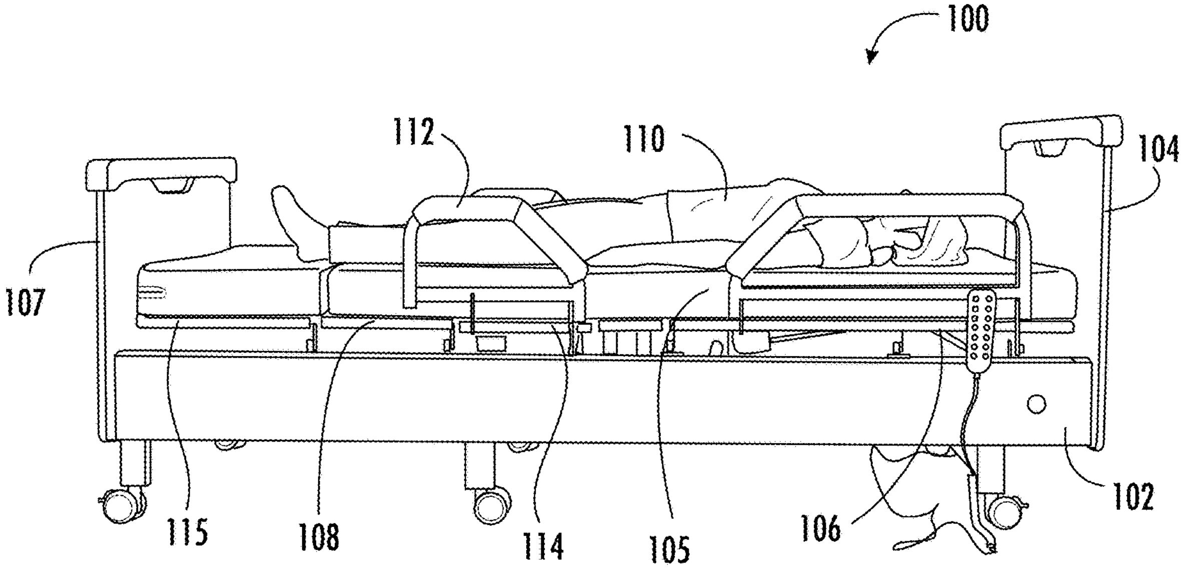
FIG. 1 is an elevational view of an articulating bed convertible to assist chair in accordance with the present disclosure.
Figure 2:
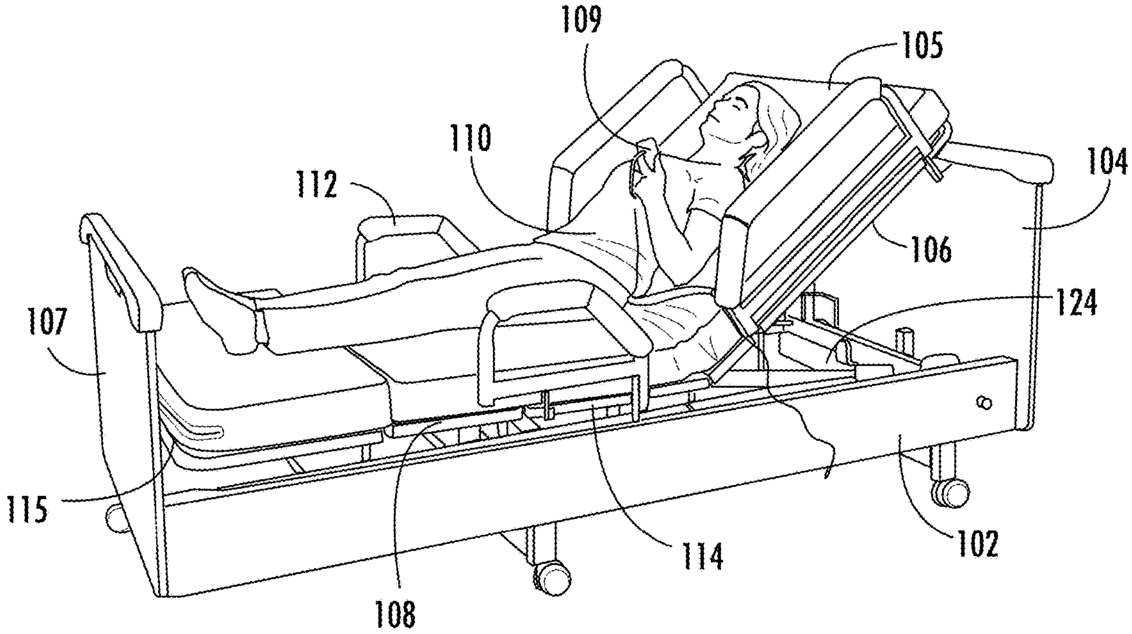
FIG. 2 is a right-side perspective view of the articulating bed.

Referring to FIGS. 1 and 2, an articulating bed that is convertible to an assist chair is shown and generally designated 100. The articulating bed 100 can be converted to an assist chair and rotated so the patient 110 can get out of and into the articulating bed 100 themselves. The articulating bed 100 includes an outer support frame 102 and an inner convertible frame 124 coupled to and supported within the outer support frame 102. A mattress platform 114 is mounted above the inner convertible frame 124 and is configured to support a mattress 105. The mattress platform 114 includes a body platform 106, a leg platform 108, and a foot platform 115. The mattress 105 is split between the leg platform 108 and the foot platform 115 so that the mattress 105 separates when converting from an articulating bed to the assist chair.

In FIG. 1, a patient 110 is shown laying on the mattress 105 and is orientated with her head towards the head of the bed 104 and her feet towards the foot of the bed 107. Siderails 112 are alongside each edge of the mattress 105 and configured to keep the patient 110 from falling out of the bed 100. The body platform 106 has been raised in FIG. 2 to elevate the body of the patient 110. A remote control 116 is configured to be used by the patient 110 or caregiver to control raising and lowering the body 106 and leg platforms 108, and to control spinning the mattress platform 114 when converting to the assist chair as described below. As those of ordinary skill in the art can appreciate, the operation of the articulating bed 100 could also be controlled using wireless or voice command, for example.

Figure 3:
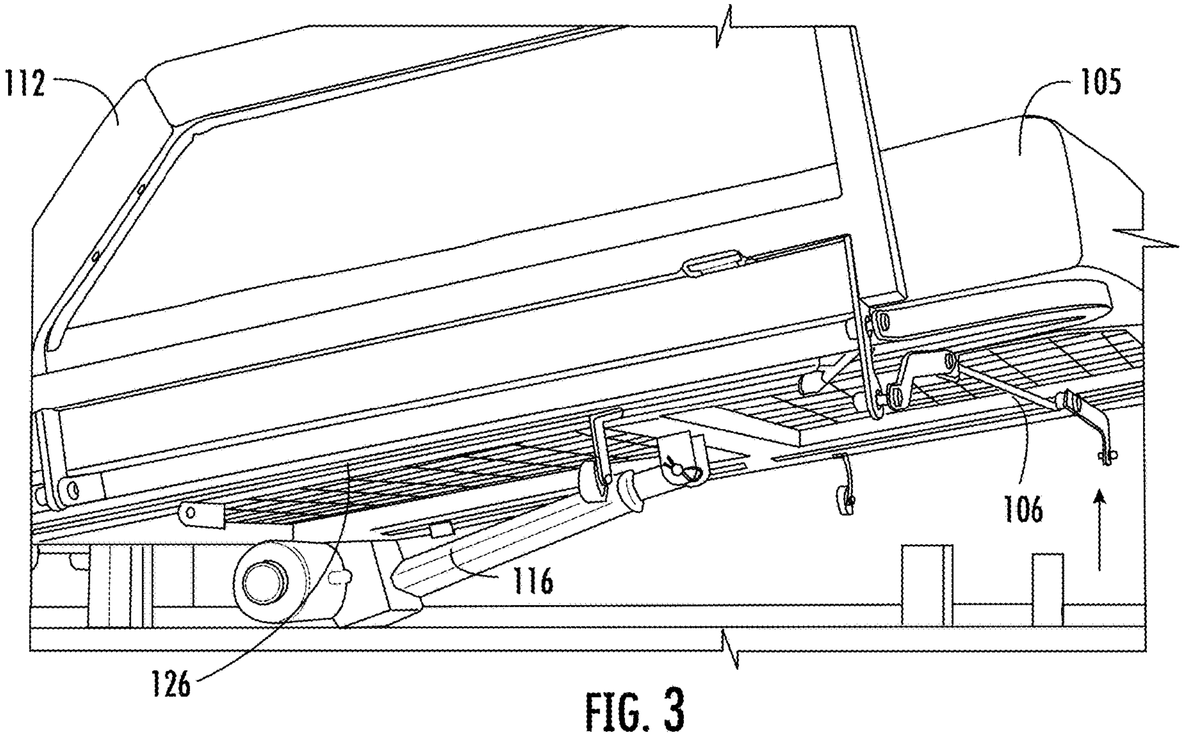
FIG. 3 is a detail view of a body lifting device of the articulating bed.
Figure 4:
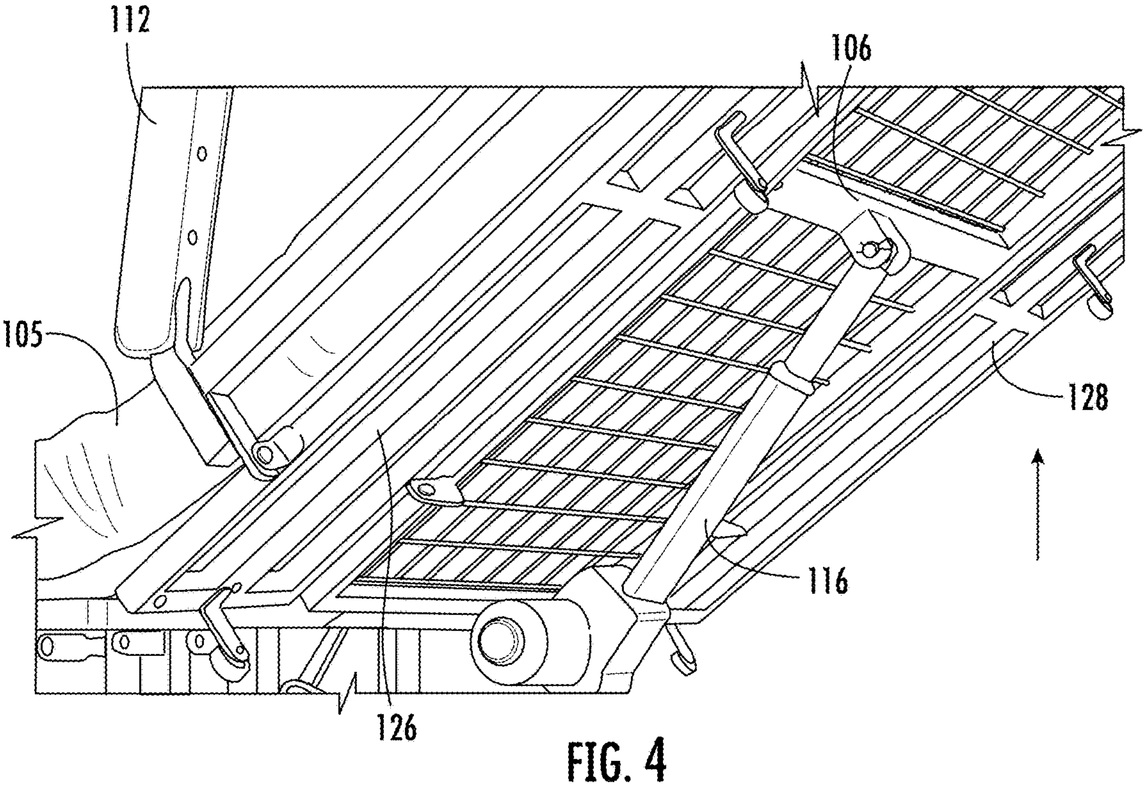
FIG. 4 is a detail view of the body lifting device in a raised position.

Referring now to FIGS. 3 and 4, a detail view of a body lifting device 116 is shown. The body lifting device 116 is secured to a support plate 120 and to the body platform 106. The support plate 120 is secured to the inner convertible frame 124, which can move independently of the outer support frame 102. The body lifting device 116 is configured to raise and lower the body platform 106 and may comprise a hydraulic or air cylinder, for example.

Also visible in FIGS. 3 and 4 is a first border section 126 hingedly connected adjacent to a longitudinal edge of the mattress platform 114 and a second border section 128 hingedly connected adjacent to an opposing longitudinal edge of the mattress platform 114. The first and second border sections 126, 128 extend the length of the mattress platform 114 and include the body portion 106, the leg portion and the foot portion 115.

Figure 5:
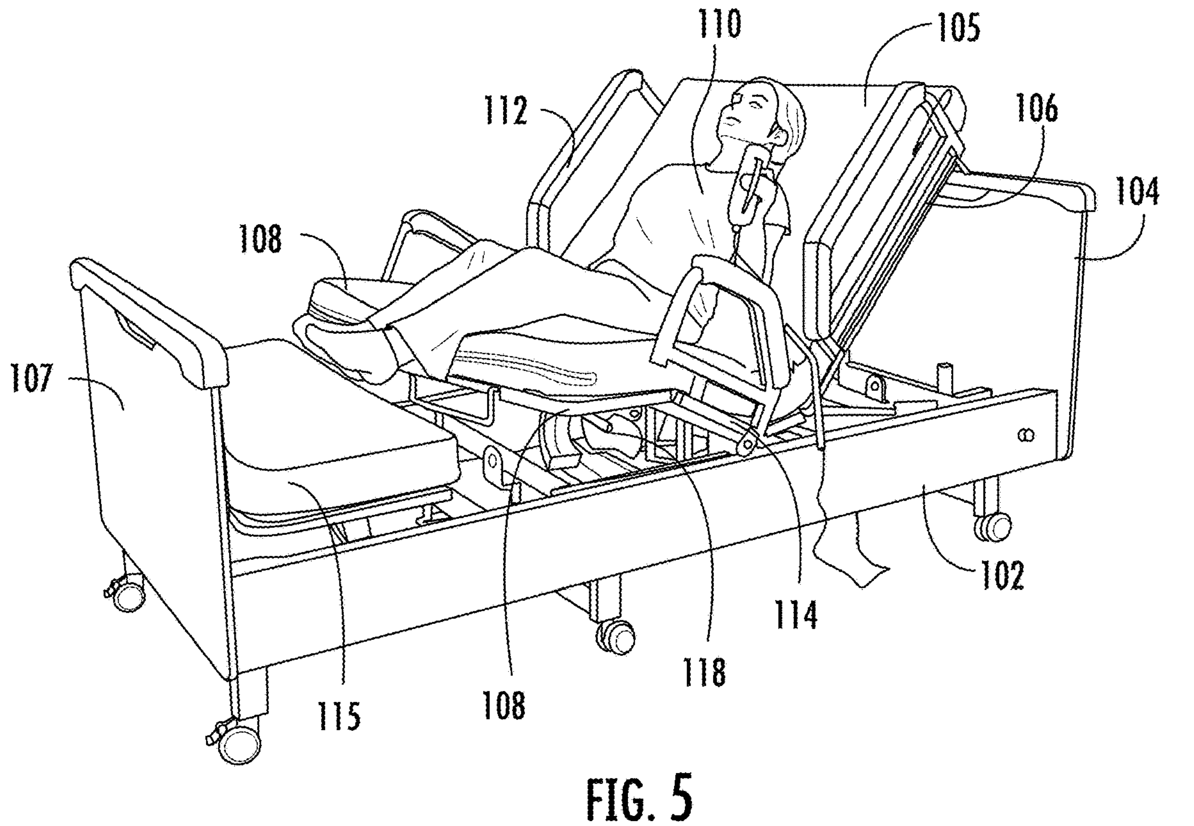
FIG. 5 is a front perspective view of the articulating bed with the body platform and the foot platform both in the raised position.
Figure 6:
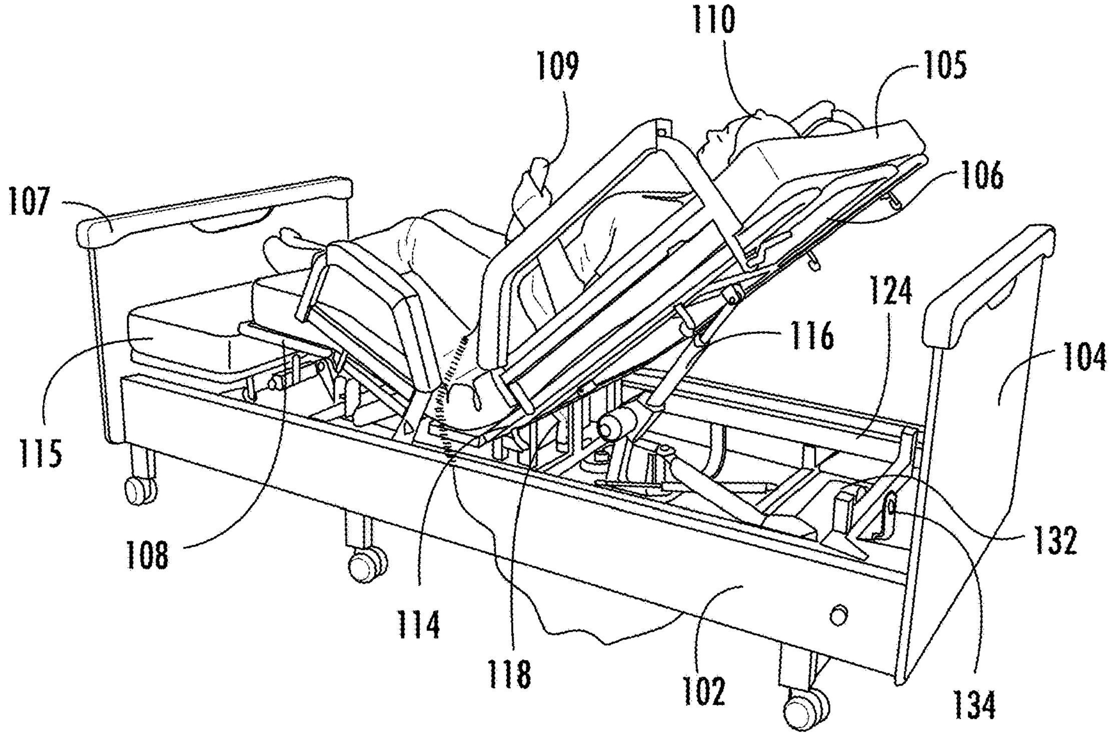
FIG. 6 is a rear perspective view of the articulating bed with the body platform and the foot platform both in the raised position.

To begin the conversion to the assist chair, the leg platform 108 is raised by a leg lifting device 118 secured to the support plate 120 and to the leg platform 108 as shown in FIGS. 5 and 6. Similar to the body lifting device 116 described above, the leg lifting device 118 is configured to raise and lower the leg platform 108. The leg lifting device 118 may comprise a hydraulic or air cylinder, for example. Also visible in FIG. 6 is a bearing 134 supporting the inner convertible frame 124 along a longitudinal centerline axis 136 described in more detail below. A roller device 132 configured to roll the inner convertible frame 124 side to side on the bearing 134 about the longitudinal centerline axis 136.

Figure 7:
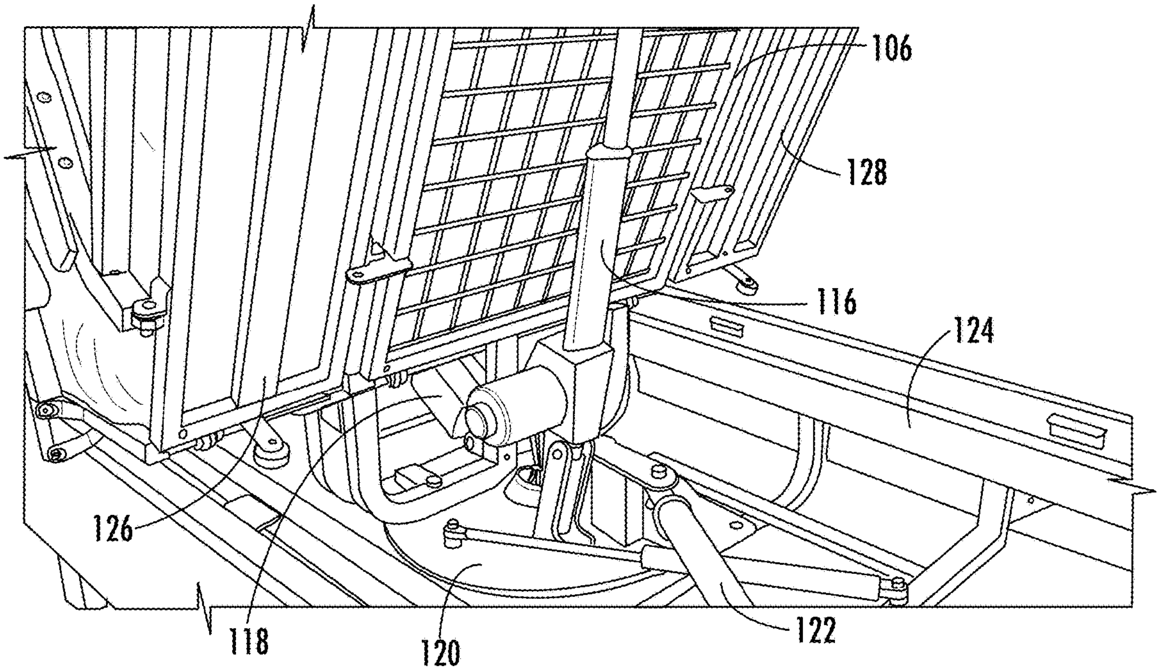
FIG. 7 is a perspective view of a support plate of the articulating bed.
Figure 8:
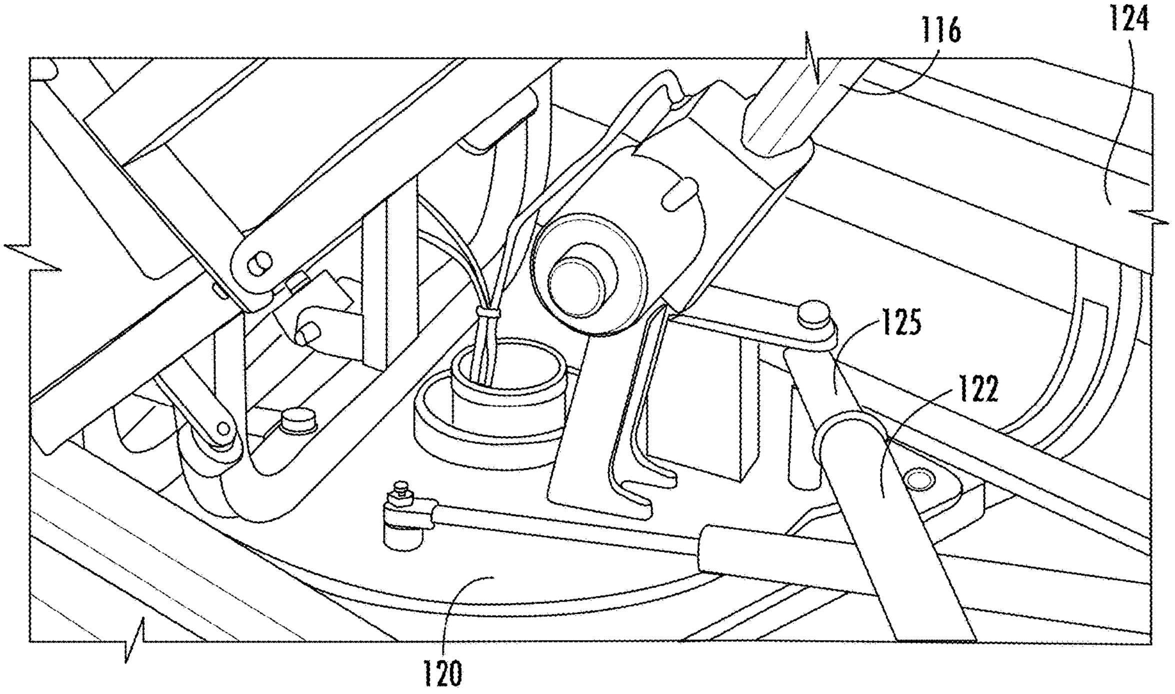
FIG. 8 is a detail view of the support plate.
Figure 9:
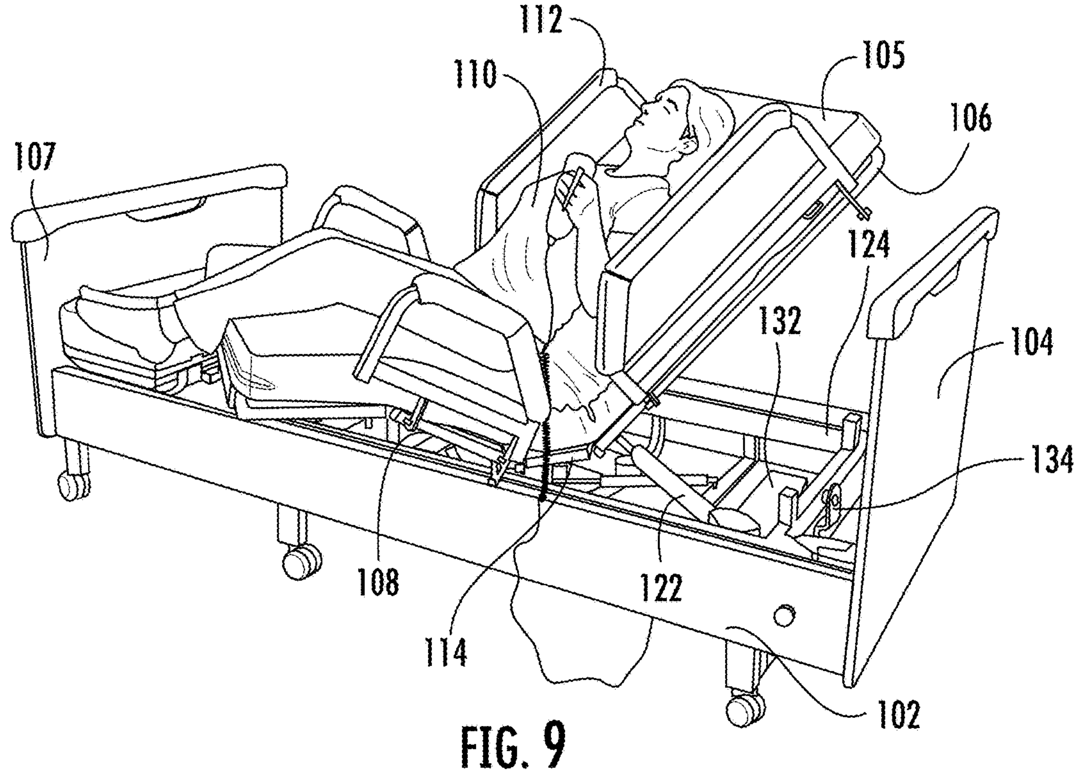
FIG. 9 is a perspective view of a mattress platform swinging over an outer support frame of the articulating bed.
Figure 10:
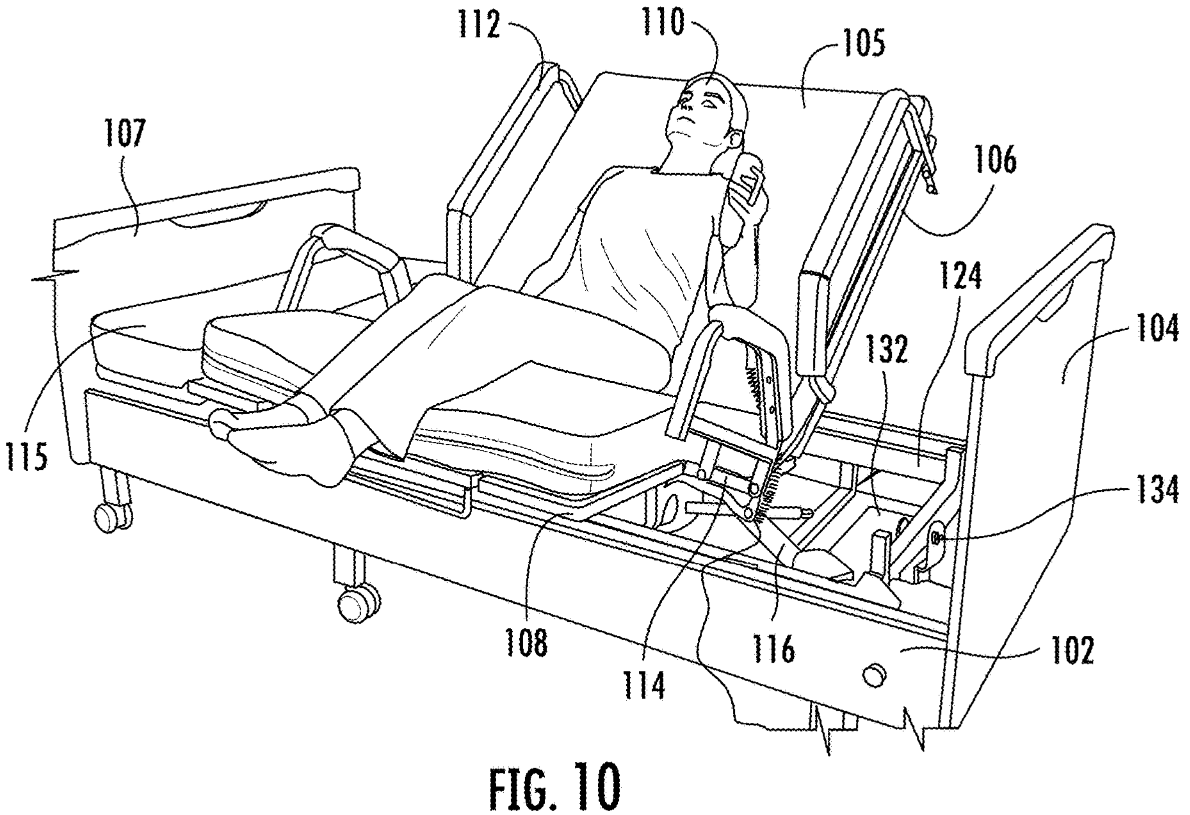
FIG. 10 is a perspective view of the articulating bed converted to an assist chair.

Once the body platform 106 and the leg platform 108 are raised to convert to the assist chair, a rotating device 122 can be used to spin the support plate 120 and the mattress platform 114. The rotating device 122 may comprise hydraulic or air cylinder, for example, as shown in FIGS. 7 and 8. In a particular aspect, the rotating device 122 may spin the support plate 120 and mattress platform 114 by extending a piston rod 125 from the hydraulic or air cylinder as shown in FIGS. 9 and 10.

The patient 110 uses the remote control 109 to activate the rotating device 122. The leg platform 108 is raised to clear the outer support frame 102 as both the body portion 106 and the leg portion 108 of the mattress platform 114 rotate. The rotating device 122 continues to rotate until the patient has rotated approximately ninety-degrees relative to the outer support frame 102 as shown in FIG. 10.

Figure 11:
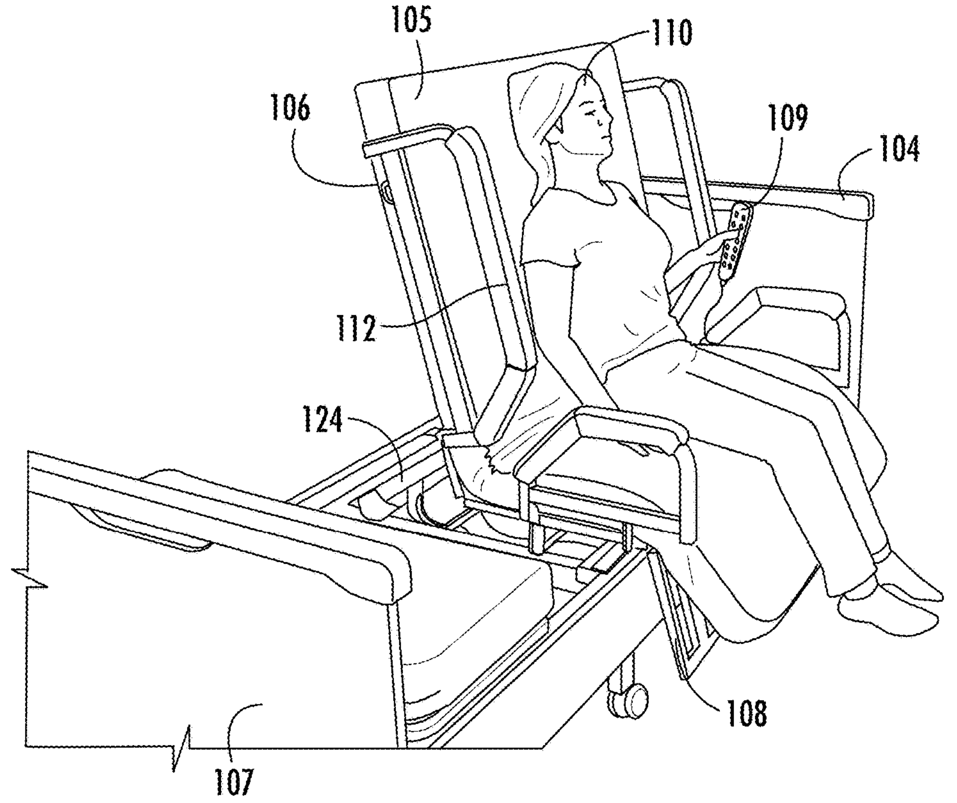
FIG. 11 is a perspective view of the assist chair of FIG. 10 tilted forward so a patient can stand up.

Once the mattress platform 114 has reached approximately ninety-degrees to the outer support frame 102, the leg platform 108 is lowered so that the feet of the patient 110 are adjacent to the floor as shown in FIG. 11. The patient 110 can then stand-up after the leg platform 108 is lowered. The process is repeated in reverse order for the patient 110 to return to laying down on the mattress 105.

Figure 12:
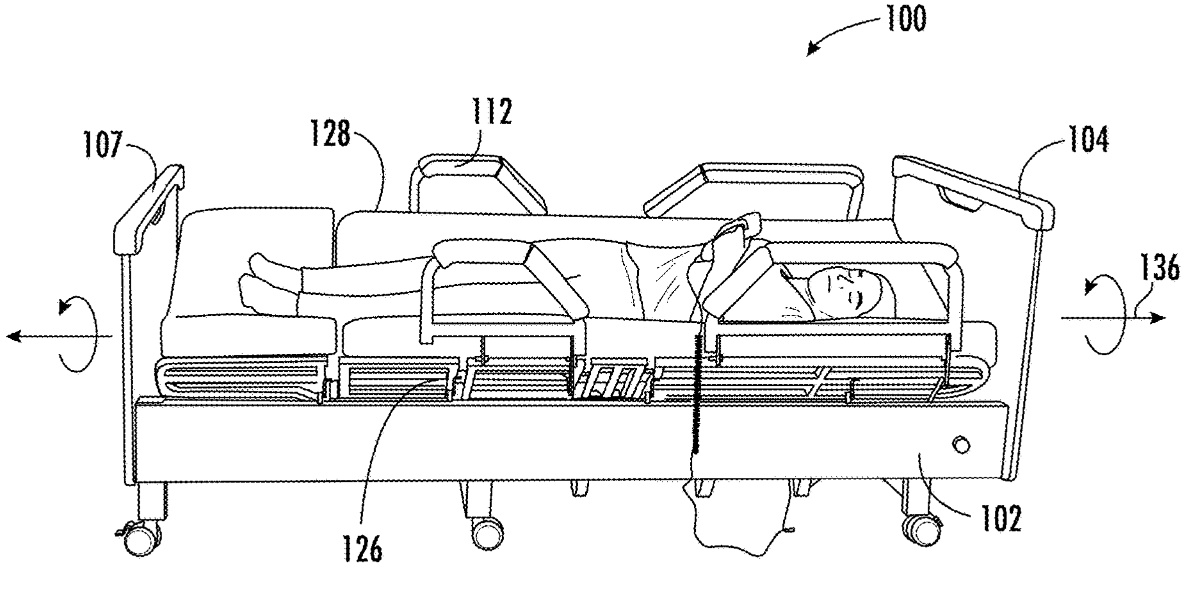
FIG. 12 is a right side perspective view of the mattress platform rolled in a first direction to form a V-shaped fold.
Figure 13:
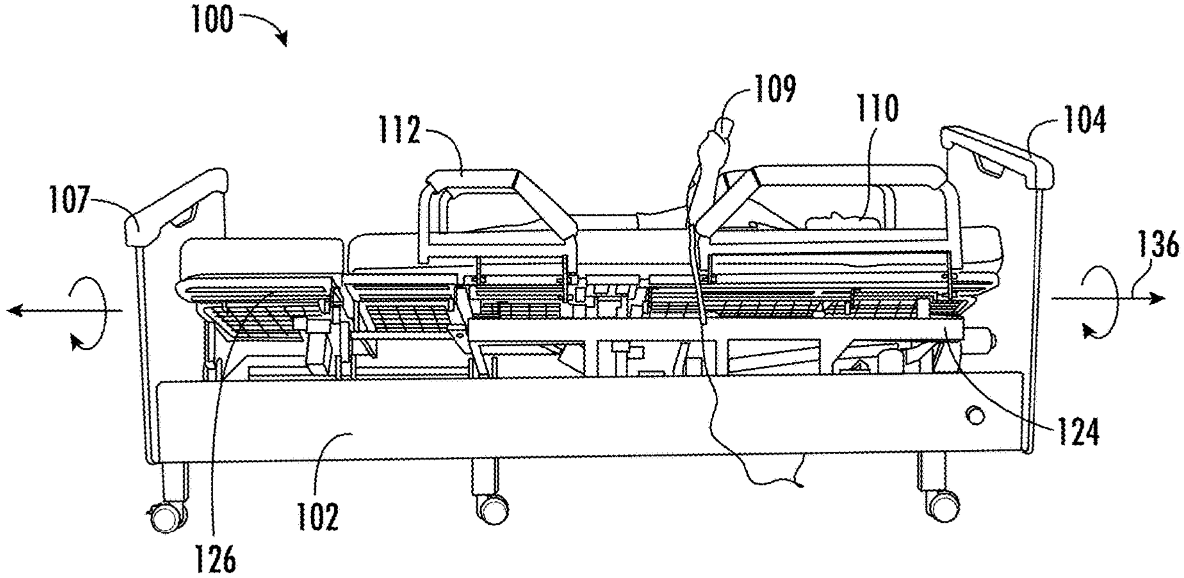
FIG. 13 is a right side perspective view of the mattress platform rolled in a second direction to form a V-shaped fold.
Figure 14:
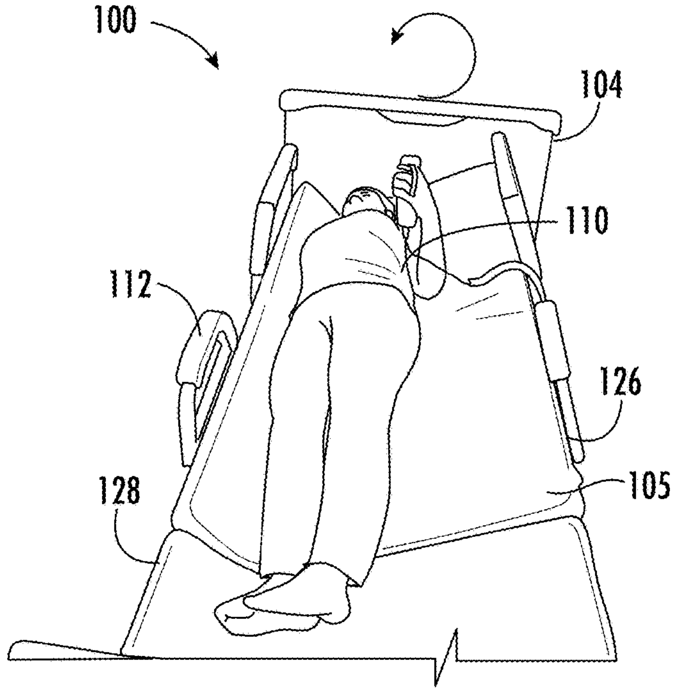
FIG. 14 is a front perspective view of the mattress platform rolled in the second direction and showing the patient lying in the V-shaped fold.

Referring now to FIGS. 12-14, as explained above, the articulating bed 100 includes a roller device 132 configured to roll the inner convertible frame 124 side to side on the bearing 134 about the longitudinal centerline axis 136.

The inner convertible frame 124 is configured to roll in a first direction about the longitudinal centerline axis 136 to raise a first side of the mattress platform 114 as an opposing second side of the mattress platform 114 is lowered as shown in FIG. 12. The first border section 126 flips upward to form a V-shaped fold in the mattress platform 114 and mattress 105 when rolled in the first direction.

The articulating bed 100 is also configured to roll in a second direction about the longitudinal centerline axis 136 to raise a second side of the mattress platform 114 as an opposing first side of the mattress platform 114 is lowered as shown in FIGS. 14 and 14. The second border section 128 flips upward to form a V-shaped fold in the mattress platform 114 and mattress 105 when rolled in the second direction.

The side of the mattress 105 that is raised is the high side and configured for the patient 110 to place their back against for support. The opposing side of the mattress 105 is the low side and is not raised as much as the high side but prevents the patient 110 from falling out without the use of a harness or other device. Either side of the mattress 105 can be the high side depending on which way the patient 110 wants to face.

The ability of the patient 110 to move from their left side to their right side is important as it eliminates bed sores from forming when the patient 110 is spending too much time on their back because they cannot move on their own to the side position. Thus, the patient 110 does not have to wait for a care giver to rotate their body which at times can be a long wait.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An articulating bed convertible to assist chair comprising:

an outer support frame;

an inner convertible frame coupled to and supported within the outer support frame;

a roller device configured to roll the inner convertible frame side to side on a bearing about a longitudinal centerline axis;

a mattress platform mounted above the inner convertible frame, the mattress platform having a body platform and a leg platform, wherein the inner convertible frame is configured to roll in a first direction about the longitudinal centerline axis to raise a first side of the mattress platform as an opposing second side of the mattress platform is lowered;

a mattress on the mattress platform, wherein the mattress platform comprises a first border section hingedly connected adjacent to a longitudinal edge of the mattress platform and a second border section hingedly connected adjacent to an opposing longitudinal edge of the mattress platform;

a support plate secured to the inner convertible frame;

a body lifting device secured to the support plate and to the body platform, the body lifting device configured to raise and lower the body platform; and a leg lifting device secured to the support plate and to the leg platform, the leg lifting device configured to raise and lower the leg platform;

wherein the support plate is configured to spin the mattress platform over the outer support frame when the body platform and the leg platform are raised and the mattress platform is converted into an assist chair.

2. The articulating bed of claim 1, further comprising a rotating device configured to spin the support plate and the mattress platform.

3. The articulating bed of claim 1, further comprising a bearing supporting the inner convertible frame along a longitudinal centerline axis.

4. The articulating bed of claim 1, wherein the first border section flips upward to form a first V-shaped fold in the mattress platform when rolled in the first direction.

5. The articulating bed of claim 4, wherein the inner convertible frame is configured to roll in a second direction about the longitudinal centerline axis to raise the opposing second side of the mattress platform as the first side of the mattress platform is lowered.

6. The articulating bed of claim 5, wherein the second border section flips upward to form a second V-shaped fold in the mattress platform when rolled in the second direction.

7. The articulating bed of claim 1, further comprising a remote control configured to be used by a patient to control raising and lowering the body and leg platforms, and to control spinning the mattress platform when converting to the assist chair.

8. The articulating bed of claim 1, further comprising siderails positioned alongside each edge of the mattress platform and configured to keep a patient from falling off the mattress.

9. An articulating bed convertible to assist chair comprising:

an outer support frame;

an inner convertible frame coupled to and supported within the outer support frame;

a mattress platform mounted above the inner convertible frame and configured to support a mattress thereon, the mattress platform having a body platform, and a leg platform;

a support plate secured to the inner convertible frame and configured to spin the mattress platform over the outer support frame when the body platform and the leg platform are raised and the mattress platform is converted into an assist chair; and a bearing supporting the inner convertible frame along a longitudinal centerline axis and a roller device configured to roll the inner convertible frame side to side on the bearing about the longitudinal centerline axis;

wherein the inner convertible frame is configured to roll in a first direction about the longitudinal centerline axis to raise a first side of the mattress platform as an opposing second side of the mattress platform is lowered, and to roll in a second direction about the longitudinal centerline axis to raise a second side of the mattress platform as an opposing first side of the mattress platform is lowered.

10. The articulating bed of claim 9, wherein the mattress platform comprises a first border section adjacent to a longitudinal edge of the mattress platform and a second border section adjacent to an opposing longitudinal edge of the mattress platform.

11. The articulating bed of claim 9, further comprising a body lifting device secured to the support plate and to the body platform, the body lifting device configured to raise and lower the body platform.

12. The articulating bed of claim 11, further comprising a leg lifting device secured to the support plate and to the leg platform, the leg lifting device configured to raise and lower the leg platform.

13. The articulating bed of claim 9, further comprising a rotating device configured to spin the support plate and the mattress platform.

* * * * *